(12) United States Patent
Guo et al.

(10) Patent No.: US 8,363,889 B2
(45) Date of Patent: Jan. 29, 2013

(54) IMAGE DATA PROCESSING SYSTEMS FOR HIDING SECRET INFORMATION AND DATA HIDING METHODS USING THE SAME

(75) Inventors: Jing-Ming Guo, Taipei (TW); Jia-Jin Tsai, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 230 days.

(21) Appl. No.: 12/820,512

(22) Filed: Jun. 22, 2010

(65) Prior Publication Data

US 2011/0194727 A1 Aug. 11, 2011

(30) Foreign Application Priority Data

Feb. 11, 2010 (TW) ................................ 99104303 A

(51) Int. Cl.
*G06K 9/00* (2006.01)
(52) U.S. Cl. ........ 382/100; 382/173; 382/232; 382/237; 382/243; 382/252; 382/272; 382/274; 358/1.9; 358/3.06; 358/3.28; 358/466; 713/176
(58) Field of Classification Search ........................ None
See application file for complete search history.

(56) References Cited

U.S. PATENT DOCUMENTS

| 7,058,199 B1* | 6/2006 | Au et al. ........................ 382/100 |
| 2003/0172274 A1* | 9/2003 | Hsia et al. ..................... 713/176 |
| 2005/0031160 A1* | 2/2005 | Shaked et al. ................. 382/100 |
| 2007/0201722 A1* | 8/2007 | Tian et al. ...................... 382/100 |
| 2010/0061647 A1* | 3/2010 | Guo .............................. 382/252 |
| 2010/0067057 A1* | 3/2010 | Guo et al. ..................... 358/3.06 |
| 2010/0067812 A1* | 3/2010 | Guo et al. ...................... 382/243 |

OTHER PUBLICATIONS

J.-M. Guo, "Improved Block Truncation Coding Using Modified Error Diffusion", Mar. 27, 2008, Electronics Letters, vol. 44, No. 7, pp. 1-2.*

* cited by examiner

*Primary Examiner* — Stephen R Koziol
*Assistant Examiner* — Timothy Choi
(74) *Attorney, Agent, or Firm* — Wang Law Firm, Inc.; Li K. Wang; Stephen Hsu

(57) ABSTRACT

An image data processing system includes an image input module, a bit map generation module and an encoding module. The image input module receives an image and secret information and obtains at least one gray-level image according to image. The bit map generation module generates a bit map image according to gray-level image and generates an ordered dithering block truncation coding (ODBTC) image according to bit map image and gray-level image. The encoding module generates an encoded gray-level image according to bit map image and secret information, wherein the encoding module divides gray-level image into image blocks, finds candidate blocks with close black and white pixel numbers among the image blocks, selects high frequency blocks belong to the high frequency region of the image from candidate blocks, and randomly embeds secret information into high frequency blocks to generate encoded gray-level image with secret information embedded therein.

11 Claims, 10 Drawing Sheets

| 131 | 70 | 185 | 124 | 139 | 77 | 178 | 116 |
|---|---|---|---|---|---|---|---|
| 39 | 193 | 23 | 247 | 46 | 201 | 31 | 240 |
| 162 | 100 | 147 | 85 | 170 | 108 | 155 | 93 |
| 15 | 224 | 54 | 209 | 8 | 232 | 62 | 216 |
| 139 | 77 | 178 | 116 | 131 | 70 | 185 | 124 |
| 46 | 201 | 31 | 240 | 39 | 193 | 23 | 247 |
| 170 | 108 | 155 | 93 | 162 | 100 | 147 | 85 |
| 8 | 232 | 62 | 216 | 15 | 224 | 54 | 209 |

| $B_0$ | $B_1$ | $B_2$ |
|---|---|---|
| $B_3$ | $B$ | $B_4$ |
| $B_5$ | $B_6$ | $B_7$ |

FIG. 4

IMAGE DATA PROCESSING SYSTEMS FOR HIDING SECRET INFORMATION AND DATA HIDING METHODS USING THE SAME

CROSS REFERENCE TO RELATED APPLICATIONS

This Application claims priority of Taiwan Application No. 099104303, filed on Feb. 11, 2010, the entirety of which is incorporated by reference herein.

BACKGROUND OF THE INVENTION

1. Field of the Invention

The invention relates to data hiding, and more particularly, to data hiding methods and corresponding processing systems for hiding secret data in grayscale (or gray-level) images using a technique with moderate computational complexity.

2. Description of the Related Art

Digital halftoning is a process to display grayscale images with a two-tone texture pattern. Halftoning is mainly used as printouts for materials such as magazines, newspapers, and books, generating a black-and-white format. Halftoning mainly takes advantage of the fact that the human visual system is not highly sensitive, so that black and white pixels of a dense uniform grid may be used to represent a desired grayscale effect. Halftoning techniques can be mainly divided into two categories: single pixel processing, and neighboring pixel processing. For single pixel processing, a halftoning output can be obtained by comparing pixel values of every pixel of an original image with some masks. Ordered dithering, for example, is a well-known scheme in the single pixel processing field.

Recently, transmittance of digital information over the Internet has rapidly grown. Digital data may be easily downloaded or manipulated and intentionally tampered with, thus making the issue of intellectual property protection more significant. Most multimedia files may be stored in a compressed bit stream format to save on storage space or transmission time. As a result, methods for data hiding have grown in significance. Embedding digital watermarks or digital signatures in multimedia content is one method of intellectual property protection for digital information, verification of ownership rights and assuring accuracy of digital information.

Hiding data in grayscale images is commonly used for data hiding. One coding method used to hide data in grayscale images is the Block Truncation coding (BTC) method. In the BTC method, an original image is divided into a number of non-overlapping image blocks and pixel values of all pixels in each non-overlapping image block are replaced by the maximum value and the minimum value of each block. Therefore, only the maximum value, the minimum value of each block and a bitmap corresponding thereto need to be transmitted for an image of high visual quality to be reconstructed at the receiving end, thus speeding up the calculation.

However, the annoying false contour and blocking effect may inherently exist in a BTC image which is encoded utilizing the BTC method, due to each block of the encoded BTC image only contains the maximum value and the minimum value of the block. In addition, image quality of the encoded image may rapidly deteriorate to be unacceptable when block truncation size increases, effecting the image quality of the encoded image.

BRIEF SUMMARY OF THE INVENTION

It is therefore an objective to provide data processing systems and data hiding methods for hiding data utilizing gray-level images to embed secret patterns of a secret information into color or gray-level images or decoding to obtain the embedded secret information and reconstructed the original image from the encoded image.

An embodiment of an image data processing system comprises an image input module, a bit map generation module and an encoding module. The image input module receives an image and a secret information and obtains at least one gray-level image according to the image. The bit map generation module is coupled to the image input module for generating a bit map image according to the gray-level image and generating an ordered dithering block truncation coding (ODBTC) image according to the bit map image and the gray-level image, wherein each pixel of the bit map image is black or white. The encoding module is coupled to the image input module and the bit map generation module for generating an encoded gray-level image according to the bit map image and the secret information, wherein the encoding module divides the gray-level image into a plurality of image blocks, finds candidate blocks with close black and white pixel numbers among the image blocks, selects high frequency blocks belong to the high frequency region of the image from the candidate blocks, and randomly embeds the secret information into the high frequency blocks to generate the encoded gray-level image with the secret information embedded therein.

In one embodiment, a data hiding method for hiding a secret information into an image for use in a system which comprises at least one bit map generation module and one encoding module is provided. The method comprises the following steps. First, an image and secret information are received and at least one gray-level image is obtained according to the image. Next, the bit map generation module generates an ordered dithering block truncation coding (ODBTC) image according to the gray-level image and a halftone array and obtains a bit map image corresponding to the ODBTC image. The encoding module then divides the gray-level image into a plurality of image blocks and finds candidate blocks with close black and white pixel numbers among the image blocks. Thereafter, the encoding module selects high frequency blocks belong to the high frequency region of the image from the candidate blocks. Then, the encoding module randomly embeds the secret information into the high frequency blocks to obtain a changed bit map image. Next, the encoding module obtains a maximum value and a minimum value of each image block within the gray-level image and replace a corresponding block, within the changed bit map image, of each image block within the gray-level image by the obtained maximum value and the minimum value of each image block to generate an encoded gray-level image with the secret information embedded therein.

In another embodiment, a data hiding method for decoding a secret information from an inputted encoded gray-level image with the secret information embedded therein for use in a system which comprises at least one decoding module is provided. The method comprises the following steps. First, the decoding module is utilized to obtain a bit map image according to the inputted encoded gray-level image. The decoding module is then is utilized to divide the bit map image into a plurality of image blocks and find candidate blocks with close black and white pixel numbers among the image blocks. Next, the decoding module is utilized to select high frequency blocks belong to the high frequency region of the encoded gray-level image from the candidate blocks. Then, the decoding module is utilized to determine an embedded bit value of each of the high frequency blocks using the high frequency blocks in the bit map image and an average gray-level image corresponding to the inputted encoded gray-level image. Thereafter, the decoding module is utilized to obtain the secret information using the determined embedded bit value of each of the high frequency blocks.

Data hiding methods and systems may take the form of a program code embodied in a tangible media. When the program code is loaded into and executed by a machine, the machine becomes an apparatus for practicing the disclosed method.

BRIEF DESCRIPTION OF THE DRAWINGS

The invention can be more fully understood by reading the subsequent detailed description and examples with reference to the accompanying drawings, wherein:

FIG. 4 is a schematic illustrating an embodiment of a 3×3 region surrounding a pixel B.

DETAILED DESCRIPTION OF THE INVENTION

Figure 1A:
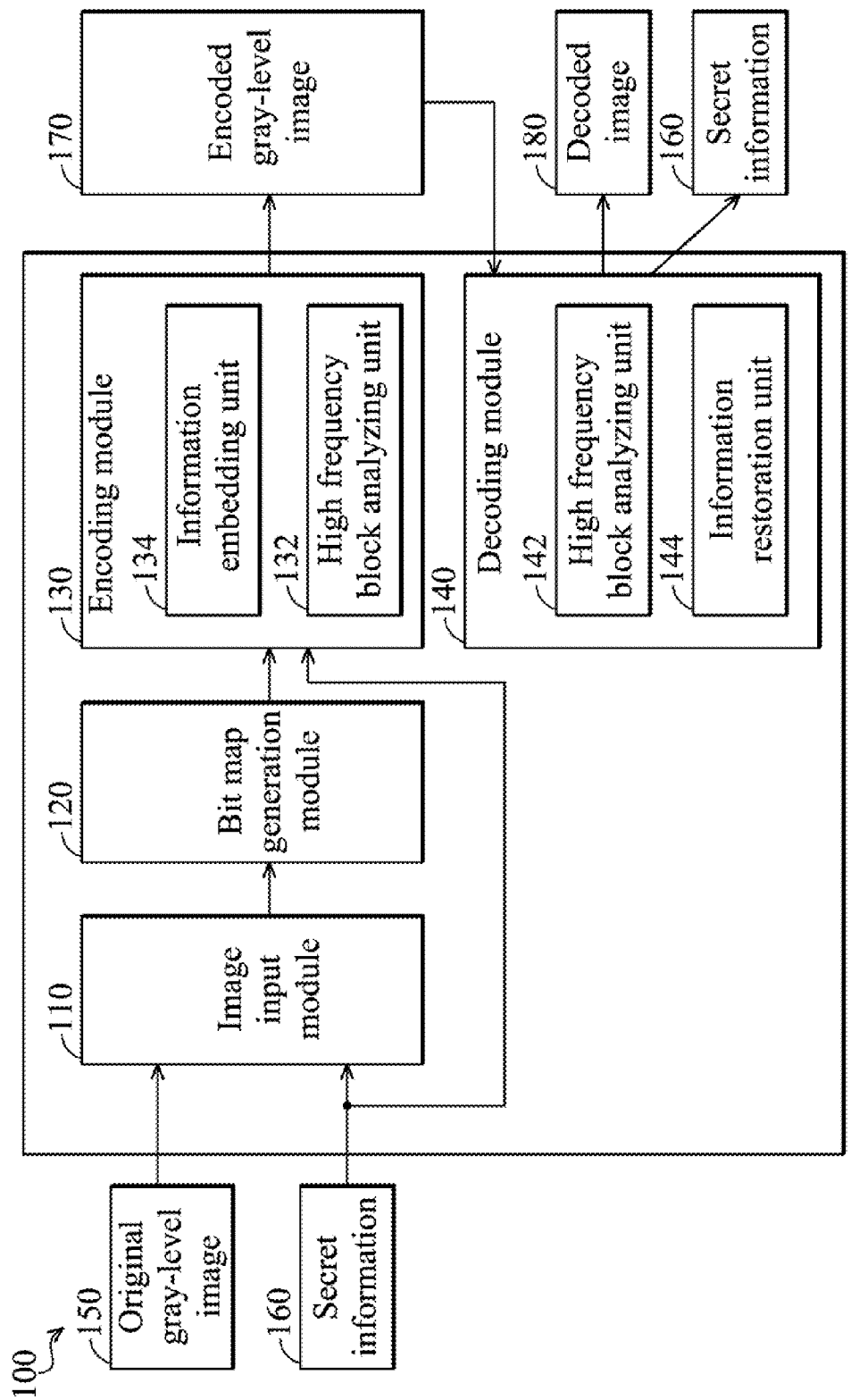
FIG. 1A shows an embodiment of a data processing system for data hiding according to the invention.

The following description is of the best-contemplated mode of carrying out the invention. This description is made for the purpose of illustrating the general principles of the invention and should not be taken in a limiting sense. The scope of the invention is best determined by reference to the appended claims.

The invention relates to data hiding methods and corresponding processing systems for hiding a secret information (e.g. a watermark in a halftone image form) into color or gray-level images or for decoding the embedded secret information from the image data and reconstructing the original gray-level or color images. The proposed data hiding method utilizes data hiding and data encoding techniques to embed (hide) the secret information into gray-level images, wherein flexible amounts of data can be embedded in the bitmap plane of an Ordered Dither Block Truncation Coding (ODBTC) image, where the ordered dithering is used to dither the quantized BTC image to avoid the annoying false contour and blocking effect inherently existed in the conventional BTC image. Accordingly, a higher decoding rate is achieved for a same image quality as compared with conventional Block Truncation Coding methods. Moreover, the correct decoding rate of 100% is maintained, and the original host ODBTC image can also be reconstructed in the decoder end when needed, which significantly boosts the flexibility in image quality control. In addition, the difference between the original image and an encoded image with a secret information embedded therein, which is generated by using the data hiding method of the invention may not be visible to the human eye and the original image can be reconstructed and the embedded secret information can be correctly decoded by decoding the encoded image for authentication, thus providing a good mechanism for property protection.

Embodiments of data processing system for data hiding are provided. It is to be noted that, for brevity, a gray-level image is illustrated as an original image in the following, but the invention is not limited thereto. In other words, the data processing systems and the data hiding methods of the invention may also be used in processing a color image which is served as the original image. For example, when the original image is a color image, the color image may be transferred to color separation images in different color planes, such as be transferred to color separation images in R, G and B color planes and each of the color separation images corresponds to a gray-level image. Then, the data hiding methods of the invention may be applied to each corresponding gray-level image of the color separation images to separately encode the secret information therein. Similarly, in decoding, the original look of the color image may be obtained by respectively decoding the encoded gray-level images for every color planes and then combining and overlapping the decoded images together. For example, in some embodiments, if the original image is a color image, the gray-level image corresponding to each color plane may be embedded with same or different secret information by applying the data hiding methods of the invention, thus capable of hiding more information. For example, three gray-level images respectively corresponding to the R, G and B color planes can be embedded with three different watermarks for data hiding and generates three corresponding encoded gray-level images. The three embedded watermarks can then be decoded from the three encoded gray-level images, each corresponding to one of the R, G and B color planes.

Figures 2A, 2B:
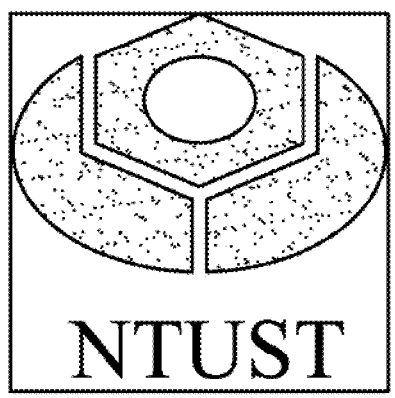
FIG. 2A illustrates an embodiment of a dither array according to the invention.
FIG. 2B illustrates an embodiment of a secret information.

FIG. 1A shows an embodiment of a data processing system 100 for data hiding according to the invention. As shown in FIG. 1A, the system 100 at least comprises an image input module 110, a bit map generation module 120, an encoding module 130 and a decoding module 140. The image input module 110 receives an image and a secret information 160 to be embedded (e.g. a watermark) and obtains at least one original gray-level image 150 according to the received image, wherein the image may be a color image or a gray-level image. It is to be noted that the image input module 110 may direct read a gray-level image as the original gray-level image 150 in this embodiment while the image input module 110 may further read a color image, transfers the color image to color separation images in R, G and B color planes and then separately uses each of the color separation images as the original gray-level image 150. The secret information 160 may be, for example, a halftone image. In general, the size of the secret information 160 depends on that of the original gray-level image 150. For example, if the original gray-level image 150 is of size 1024×1024 and each of the divided image blocks is of size 8×8, the size of the secret information 160 must be set to 128×128, as shown in FIG. 2B. The bit map generation module 120 is coupled to the image input module 110 for receiving the original gray-level image 150 and the secret information 160 and performing the ODBTC method of the invention to generate a bit map image encoded by the ODBTC. Note that the ODBTC encoding used herein is a mix of ordered dithering (OD) and block truncation coding (BTC) techniques, wherein each pixel value of the pixels of the bitmap may be calculated by the formula (1) listed blow.

Figure 1B:
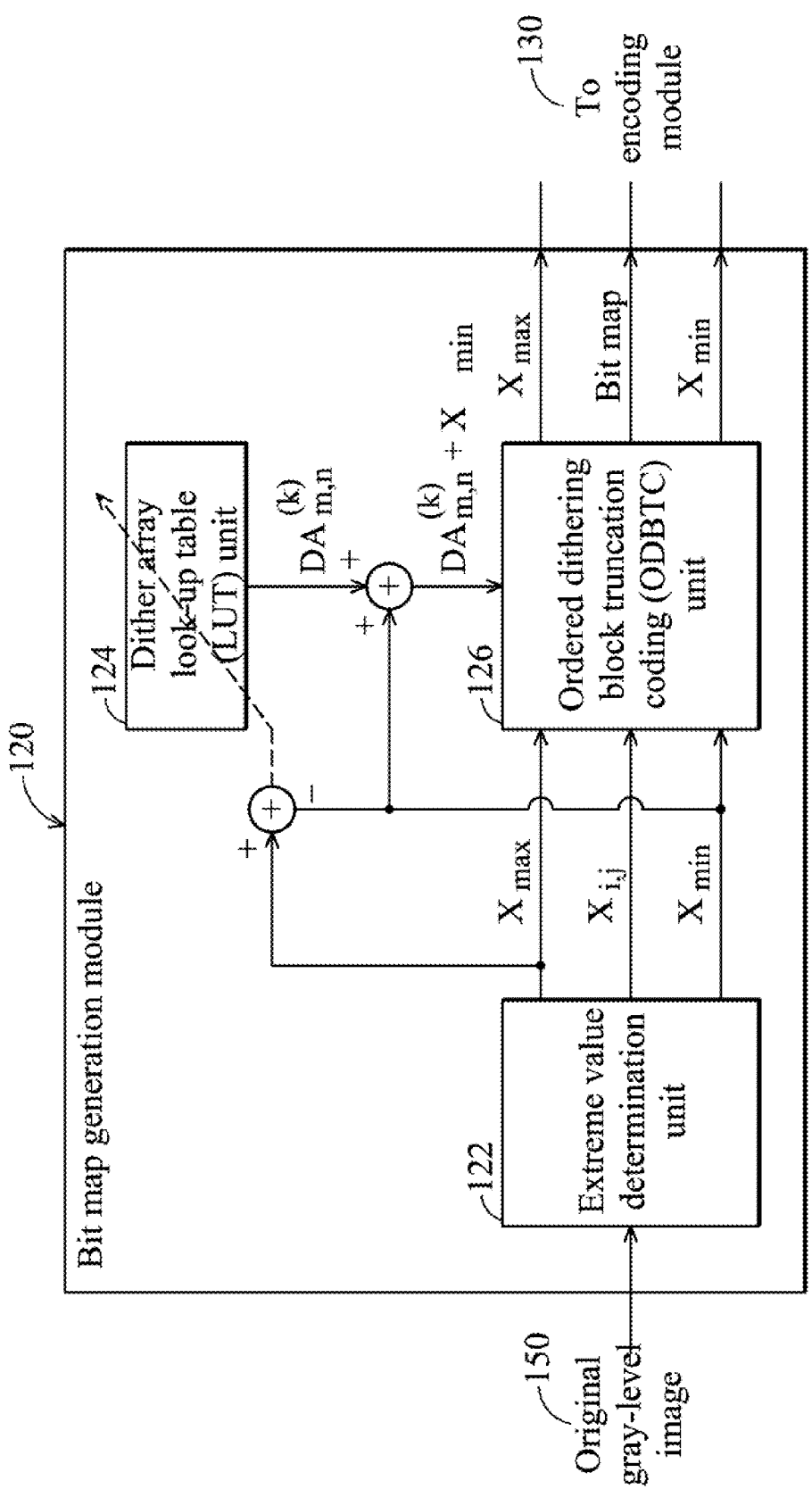
FIG. 1B shows an embodiment of a detailed architecture of a bit map generation module according to the invention.

Refer to FIG. 1B, which shows an embodiment of a detailed architecture of a bit map generation module 120 according to the invention. As shown in FIG. 1B, the bit map generation module 120 may further comprise an extreme value determination unit 122, a dither array lookup table unit 124 and an ODBTC unit 126. The extreme value determination unit 122 may divide the received original gray-level image 150 into multiple image blocks, finds a maximum value $X_{max}$ and a minimum value $X_{min}$ of each divided block and transmits the found maximum value $X_{max}$ and minimum value $X_{min}$ of each divided block to the ODBTC unit 126. The ODBTC unit 126 may then receive the found maximum value $X_{max}$ and minimum value $X_{min}$ of each divided block from the extreme value determination unit 122, converts the original gray-level image 150 into a halftone image 150' (i.e. the pixel value of which is either black (0) or white (255)) using a dither array (as shown in FIG. 2A) and replaces black or while pixel within each divided block of the halftone image 150' by the maximum value $X_{max}$ and the minimum value $X_{min}$ of the block corresponding thereto respectively to generate an ODBTC encoded image, wherein the black pixel is replaced by the minimum value $X_{min}$ while the white pixel is replaced by the minimum value $X_{min}$.

In the embodiments of the invention, a gray-level or multi-scale image is converted to a halftone image by an order dithering processes. Methods for calculation of converting a grayscale or multi-scale image to a halftone image by order dithering processes are well-known in the art, and thus detailed are omitted here for brevity while only results are listed in the following for reference.

First, in this embodiment, the extreme value determination unit 122 divides the original image with blocks of size M×N into multiple sub-blocks of size n×n. Suppose $X_i$ represents values of the pixels in a block, the first, second moments, and the variance of each block can be calculated and then the values of the pixels within a block can be represented by the high mean, low mean and the bit map according to the calculated first, second moments, and the variance thereof.

Suppose the maximum and minimum values of the block in BTC are denoted as $x_{max}$ and $x_{min}$, respectively. The size of the dither array is the same as that of the divided block in BTC. The ODBTC unit 126 may generate the ODBTC image using following formula:

$$o_{i,j} = \begin{cases} x_{max}, & \text{if } x_{i,j} \geq DA^{(k)}_{imodM,jmodN} + x_{min} \\ x_{min}, & \text{if } x_{i,j} < DA^{(k)}_{imodM,jmodN} + x_{min}, \end{cases} \quad (1)$$

where $o_{i,j}$ denotes the output pixel value, and $k=x_{max}-x_{min}$. The reason that the previous high mean and low mean are replaced with the two extreme values. $x_{max}$ and $x_{min}$, is that the threshold values in dither array may be higher than that of the high mean or lower than that of the low mean. This phenomenon causes the reconstructed results perceived quite dull. Therefore, a table lookup method based on the ODBTC image is further provided such that the dither array lookup table unit 124 may adjust each specific size dither array to 255 through the formula (2) listed below, where each specific size dither array has its corresponding 255 different scaling versions. The 255 scaling versions can be obtained by following formula (2):

$$DA^{(k)}_{m,n} = k \times \frac{DA_{m,n} - DA_{min}}{DA_{max} - DA_{min}}, \quad (2)$$

where $1 \leq k \leq 255$, $1 \leq m \leq M$, and $1 \leq n \leq N$; $DA_{min}$ and $DA_{max}$ denote the minimum and maximum values in dithered array respectively. The dynamic range of $DA_{m,n}^{(k)}$ is k and the minimum value is 0. Consequently, the member values in $DA_{m,n}^{(k)}$ must be added by $x_{min}$ to provide a fair thresholding with all pixel values in a block. Since the dither arrays $DA_{m,n}^{(k)}$ can be pre-calculated off-line as a lookup table (LUT) for usage, the complexity can be significantly reduced.

The encoding module 130 is coupled to the image input module 110 and the bit map generation module 120 for generating an encoded gray-level image 170 according to the bit map image generated by the bit map generation module 120 and the secret information. The encoding module 130 may further comprise a high frequency block analyzing unit 132 and an information embedding unit 134, wherein the high frequency block analyzing unit 132 divides the gray-level image into a plurality of image blocks, finds candidate blocks with close black and white pixel numbers among the image blocks, and then selects high frequency blocks belong to the high frequency region of the image from the candidate blocks. The information embedding unit 134 randomly embeds the secret information into the selected high frequency blocks to generate the encoded gray-level image 170 with the secret information embedded therein. Detailed description of the operation of the encoding module 130 will be detailed below with reference to description of FIG. 3.

Figure 3:
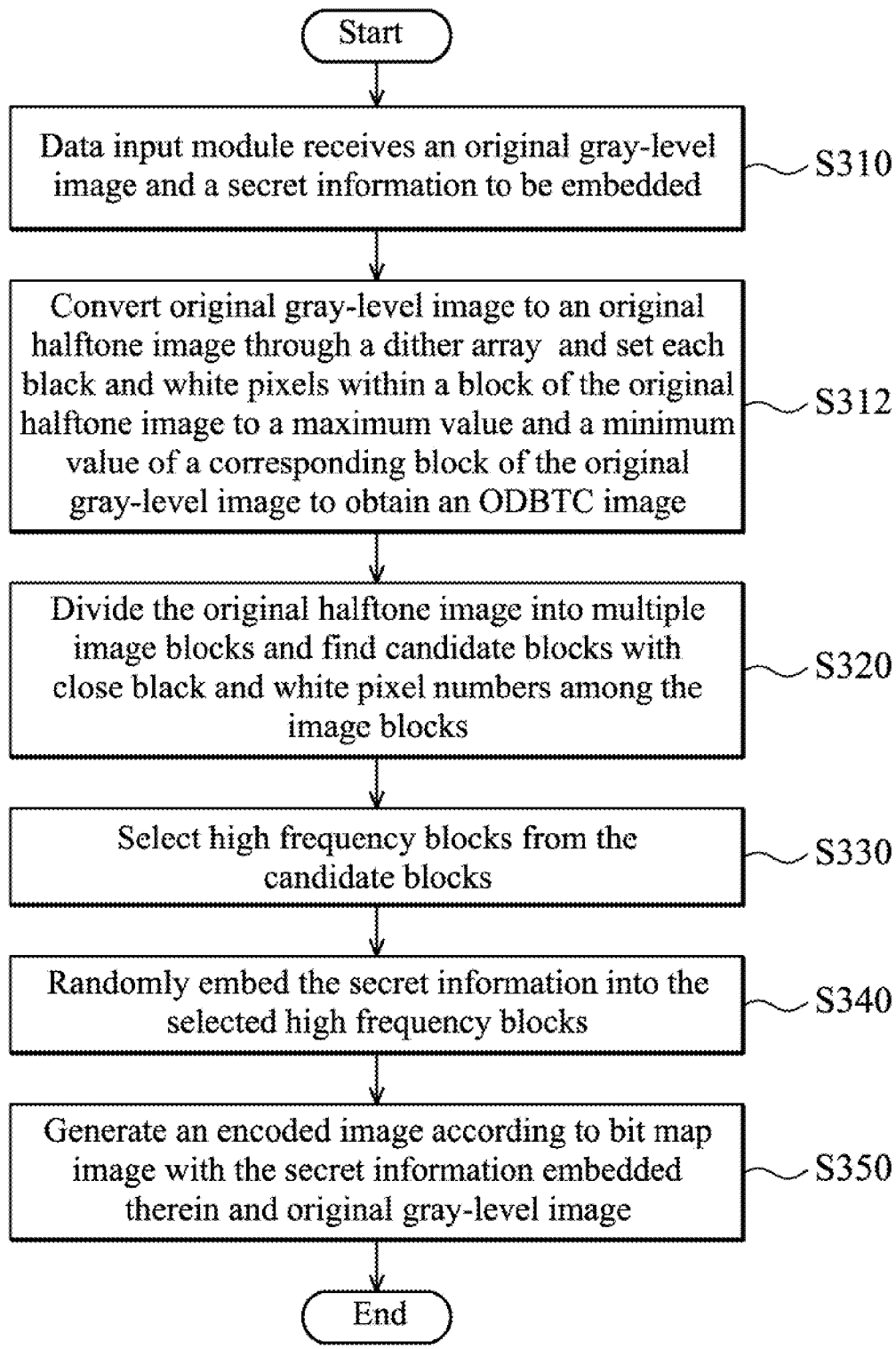
FIG. 3 is a flowchart showing an embodiment of a data hiding method for hiding data of a secret information into gray-level images according to the invention.

FIG. 3 is a flowchart showing an embodiment of a data hiding method for hiding data of a secret information into gray-level images according to the invention. The data hiding method of the invention can be applied in the system 100 shown in FIG. 1A. Similarly, an original gray-level image 150 of the invention may be obtained by a directly inputted gray-level image or color separation images of an inputted color image. First, in step S310, an original gray-level image 150 and a secret information 160 to be embedded are received by the data input module 110, wherein the secret information 160 is a halftone image. In general, the size of the secret information 160 depends on that of the original gray-level image 150. For example, if the size of the original gray-level image 150 is 1024×1024 and each of the divided image block sizes is 8×8, the size of the secret information 160 must be set to 128×128.

Next, in step S312, the bit map generation module 120 converts the original gray-level image 150 to an original halftone image through a dither array (as shown in FIG. 2A) and configures each black and white pixels within a block of the original halftone image to a maximum value and a minimum value of a corresponding block of the original gray-level image 150 so as to obtain an ODBTC image.

Thereafter, in step S320, the high frequency block analyzing unit 132 divides the original halftone image (i.e. the bit map image) into multiple image blocks and finds candidate blocks with close black and white pixel numbers among the image blocks. Note that determination of whether a block is the candidate block with close black and white pixel numbers among the image blocks can be achieved by the formula (3) listed below.

Because the dither array employed is of size 16×16 and has diagonal symmetry property, the dither array may be divided into 4 blocks, each of which is of size 4×4. FIG. 2A illustrates an embodiment of a dither array according to the invention. As shown in FIG. 2A, the left-up portion of the dither array is the same as its right-bottom portion and the right-up portion of the dither array is the same as its left-bottom portion so that the original halftone image can be divided into image blocks of size 4×4. Next, blocks with close black and white pixel numbers among the image blocks of the halftone image are selected as the candidate blocks. Note that determination of whether a block is the candidate block with close black and white pixel numbers among the image blocks can be achieved by the formula (3) listed below:

$$|\text{\#black pixel} - \text{\#white pixel}| < BW_{Th} \quad (3),$$

wherein #black pixel represents a total number of black pixels within a block, #white pixel represents a total number of white pixels within the block and $BW_{Th}$ represents an adjustable threshold parameter, which can be defined according to the actual requirement. Therefore, a block is referred to as a candidate block when the formula (3) is satisfied.

After determining all of the candidate blocks, in step S330, the high frequency block analyzing unit 132 selects high frequency blocks from the candidate blocks. Detailed description of how to select high frequency blocks from the candidate blocks are detailed below with reference to the formula (4).

The high frequency block analyzing unit 132 may determine whether a found candidate block is a high frequency block by determining whether the found candidate block satisfies the following formula (4):

$$CON_{max} \geq \text{\#connect} \geq CON_{min} \quad (4),$$

where the variables $CON_{max}$ and $CON_{min}$ denote the two other adjustable parameters. In general, the larger $CON_{max}$ and smaller $CON_{min}$ generally acquire more blocks to embed secret information. However, the determination may be erroneous at the decoding end if the variable value is too large or too small. Therefore, a candidate block is belong to the high frequency portion of the halftone image and is defined as a high frequency block when the formula (4) is satisfied. Note that the variable # connect is defined as follows. Consider a pixel P at location (m, n) and its neighbors in a 3×3 region, a variable con(m, n) is defined as follows:

$$con(m, n) = \sum_{i=0}^{7} w(i)h(P, P_i)$$

where $$h(P, P_i) = \begin{cases} 1 & P = P_i, \\ 0 & P \neq P_i, \end{cases}$$

$$w(i) = \begin{cases} 1, & \text{for } i = 1, 3, 4, 6 \\ 0, & \text{for } i = 0, 2, 5, 7. \end{cases}$$

Figure 4:
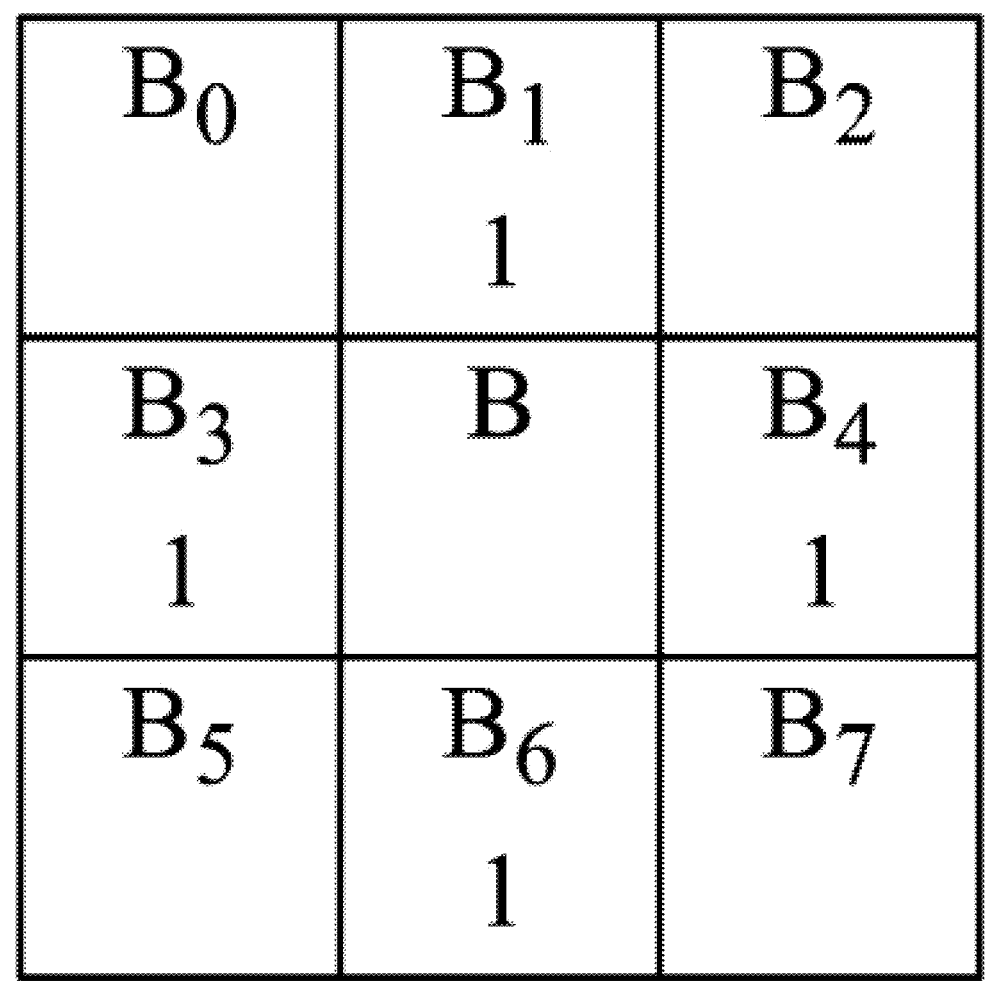

Please refer to FIG. 4, which illustrates an embodiment of a 3×3 region surrounding a pixel. B. Thereafter, the value of the variable # connect can be obtained by accumulated all of the con(m,n) in a block. The total sum of con(m,n) in a block is defined as following formula:

$$\text{\# connect} = \sum_{m,n \in \frac{M}{2} \times \frac{N}{2}} \sum con(m, n), \quad (5)$$

wherein M×N in the formula (5) stands for the size of the dither array, and equals a 8×8 array as shown in FIG. 2A. Therefore, a candidate block which satisfies the aforementioned formula (4) can be referred to as the high frequency block.

After the high frequency blocks have been found, the information embedding unit 134 may then embed the secret information 160 to be embedded into the selected high frequency blocks. Therefore, in step S340, the information embedding unit 134 randomly embeds the secret information 160 into the selected high frequency blocks. As the secret information 160 is a halftone image, the secret information 160 only contains values 0 (i.e. a gray-level value 0) and 1 (i.e. a gray-level value 255). In this step, if an attempt is made to embed information bit "1", then all pixel values in the corresponding high frequency block are reversed, i.e. a black pixel is reversed to a white pixel while a white pixel is reversed to a black pixel. On the contrary, if an information bit "0" is to be embedded, then all pixels values in the corresponding high frequency block remain the same. During the data hiding process, a pixel in the secret information will be embedded into one of the high frequency blocks.

It is to be understood that, in other embodiments, the original secret information may further be scattered by a predetermined key to form a secret information image before embedding the secret information and then the formed secret information image is used in step S340 to obtain a changed halftone image so as to provide further data protection.

In step S350, the information embedding unit 134 further maps this changed halftone image to the corresponding original gray-level image 150 and fills the maximum value and the minimum value of each block in the gray-level image 150 to the corresponding block to obtain the encoded gray-level image 170 with the secret information embedded therein. It is to be noted that, in this embodiment, the divided block is of size 8×8, and the divided block is of size 4×4 to use the maximum and minimum values in every block with a size 4×4 to substitute the embedded bitmap only when the halftone image with the secret information embedded therein is required to fill in the maximum and minimum value. Therefore, the blocking effect for the image may be significantly reduced. After the aforementioned steps S310-S350 have been performed, the secret information will be embedded into the image.

Figure 5:
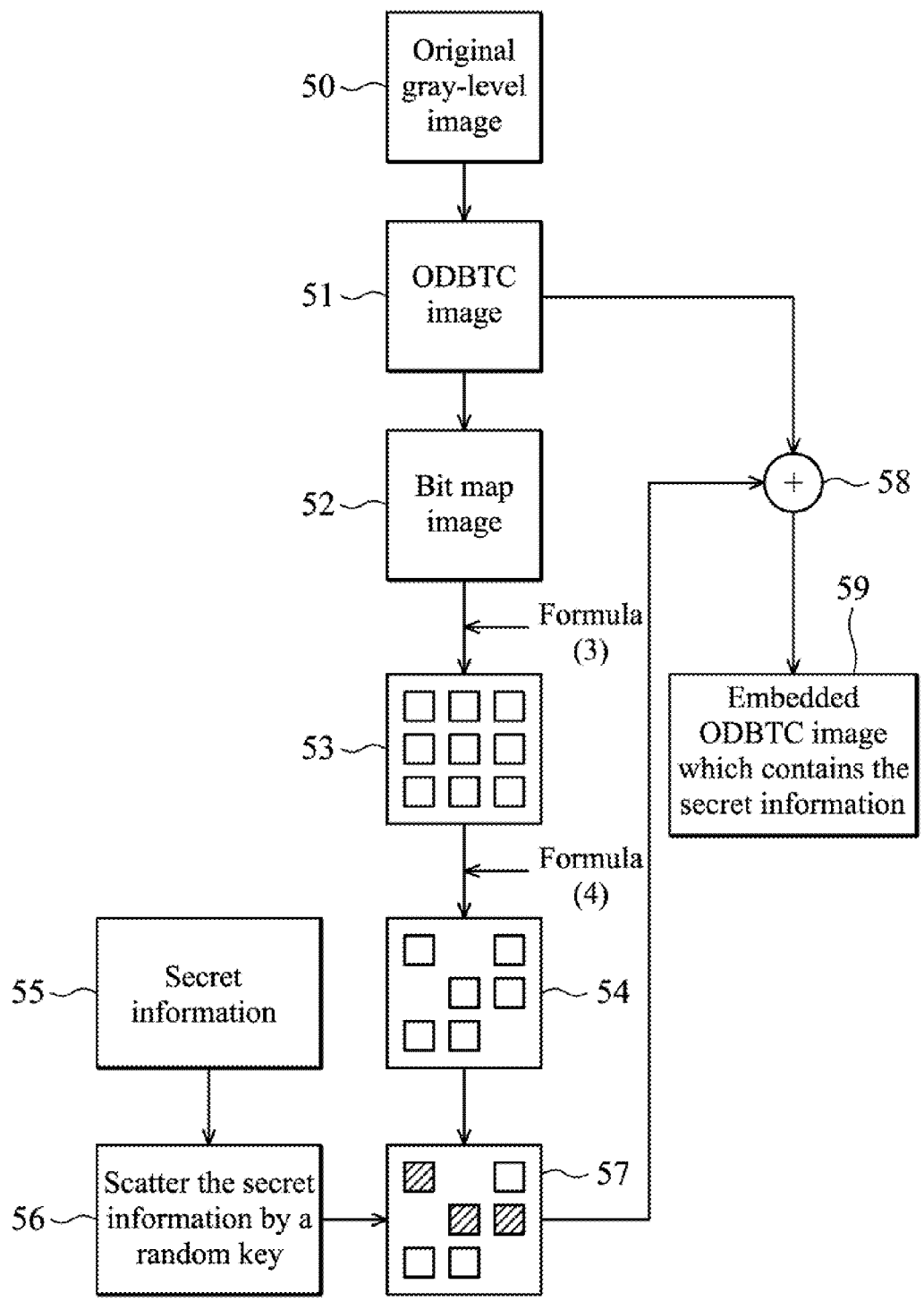
FIG. 5 is a flowchart showing another embodiment of a data hiding method for hiding data of a secret information into gray-level images according to the invention.

FIG. 5 is a flowchart showing another embodiment of a data hiding method for hiding data of a secret information into gray-level images according to the invention.

Figure 8A:
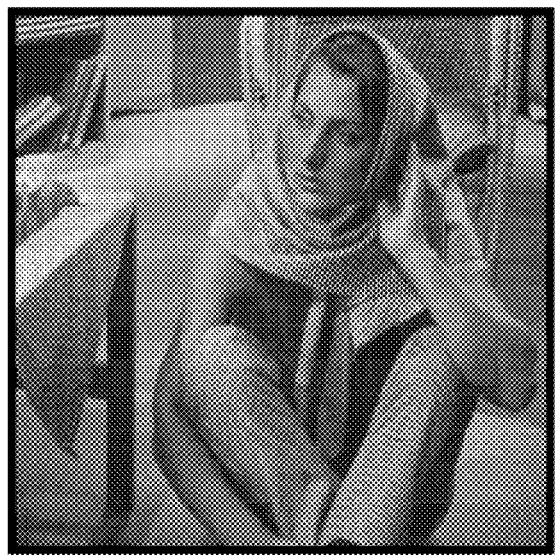
FIG. 8A shows an embodiment of the original gray-level image according to the invention.
Figure 8B:
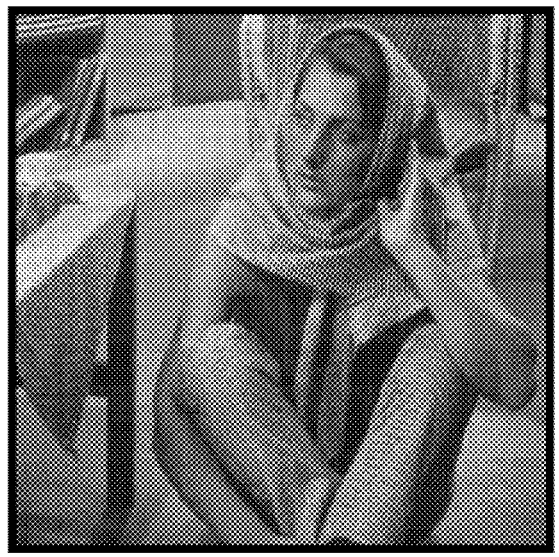
FIG. 8B shows an embodiment of an ODBTC image generated from the original gray-level image of FIG. 8A by using the data hiding method of the invention.
Figure 8C:
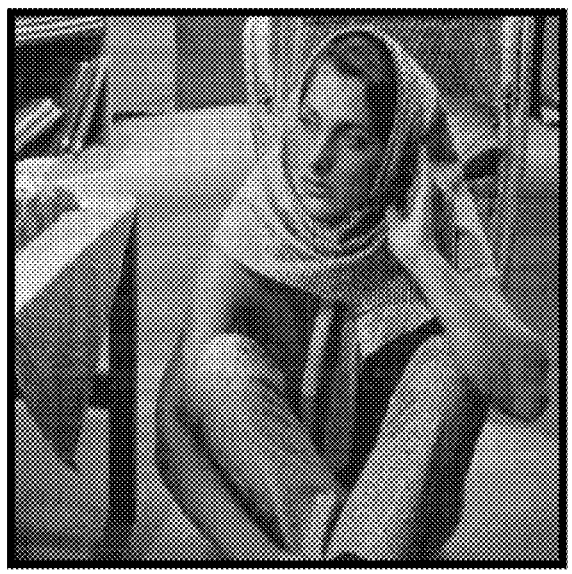
FIG. 8C shows an embodiment of an encoded gray-level image with the secret information embedded therein generated from the image of FIG. 8B by using the data hiding method of the invention.

Please refer to FIGS. 8A-8C. FIG. 8A shows an embodiment of the original gray-level image according to the invention. FIG. 8B shows an embodiment of an ODBTC image generated from the original gray-level image of FIG. 8A by using the data hiding method of the invention. FIG. 8C shows an embodiment of an encoded gray-level image with the secret information embedded therein generated from the image of FIG. 8B by using the data hiding method of the invention.

First, the original gray-level image (50) (as shown in FIG. 8A) is encoded to the ODBTC image (51) (as shown in FIG. 8B) by the aforementioned ODBTC encoding method of the invention and then a bit map image (52) is obtained from the ODBTC image (51). Next, possible candidate blocks (53) are found from the bit map image (52) by the formula (3) and high frequency blocks (54) are selected from the possible candidate blocks (53) by the formula (4). The selected high frequency blocks (54) will be used for embedding the secret information. Thereafter, the secret information (55) is first scattered by a random key (56) and then the scattered secret information are embedded into the corresponding high frequency blocks (54). When a bit value to be embedded is 1, bit values of all of pixels within a high frequency block to be embedded will be reversed, i.e, a black pixel is reversed to a white pixel while a white pixel is reversed to a black pixel. On the contrary, if a bit value to be embedded is 0, the bit values of all of pixels within the high frequency block to be embedded remain the same. Therefore, a changed bit map image (57) can be generated, wherein the changed bit map image embeds the secret information. Lastly, the ODBTC image (51) and the changed bit map image (57) are merged (58) to obtain an ODBTC image which contains the secret information (as shown in FIG. 8C) (59). The ODBTC image which contains the secret information is referred to as the encoded gray-level image. Then, the encoded gray-level image can be transmitted to the receiving end.

The system 100 may further comprise a decoding module 140 for decoding a secret information 160 from an inputted encoded gray-level image with the secret information embedded therein and reconstructing the gray-level image or the color image (i.e, the decoded image 180). The decoding module 140 may further comprise a high frequency block analyzing unit 142 and an information restoration unit 144, wherein the high frequency block analyzing unit 142 is used for finding the high frequency blocks belonging to the high frequency region of the image from the image, which operation is similar to that of the high frequency block analyzing unit 132, and thus detailed descriptions are omitted here for brevity. The information restoration unit 144 maps the information bits of the secret information determined from the high frequency blocks detected by the high frequency block analyzing unit 142 to corresponding block positions to obtain a halftone image. Note that the obtained halftone image is the embedded secret information. It is to be noted that, if the original secret information is first scattered by a predetermined key before embedding the secret information, an inverse-scattered operation must be performed on the obtained halftone image with the random key that is previously used so as to decode and obtain the actual embedded secret information. Detailed description of the operation of the decoding module 140 will be detailed below with reference to description of FIG. 6.

Figure 6:
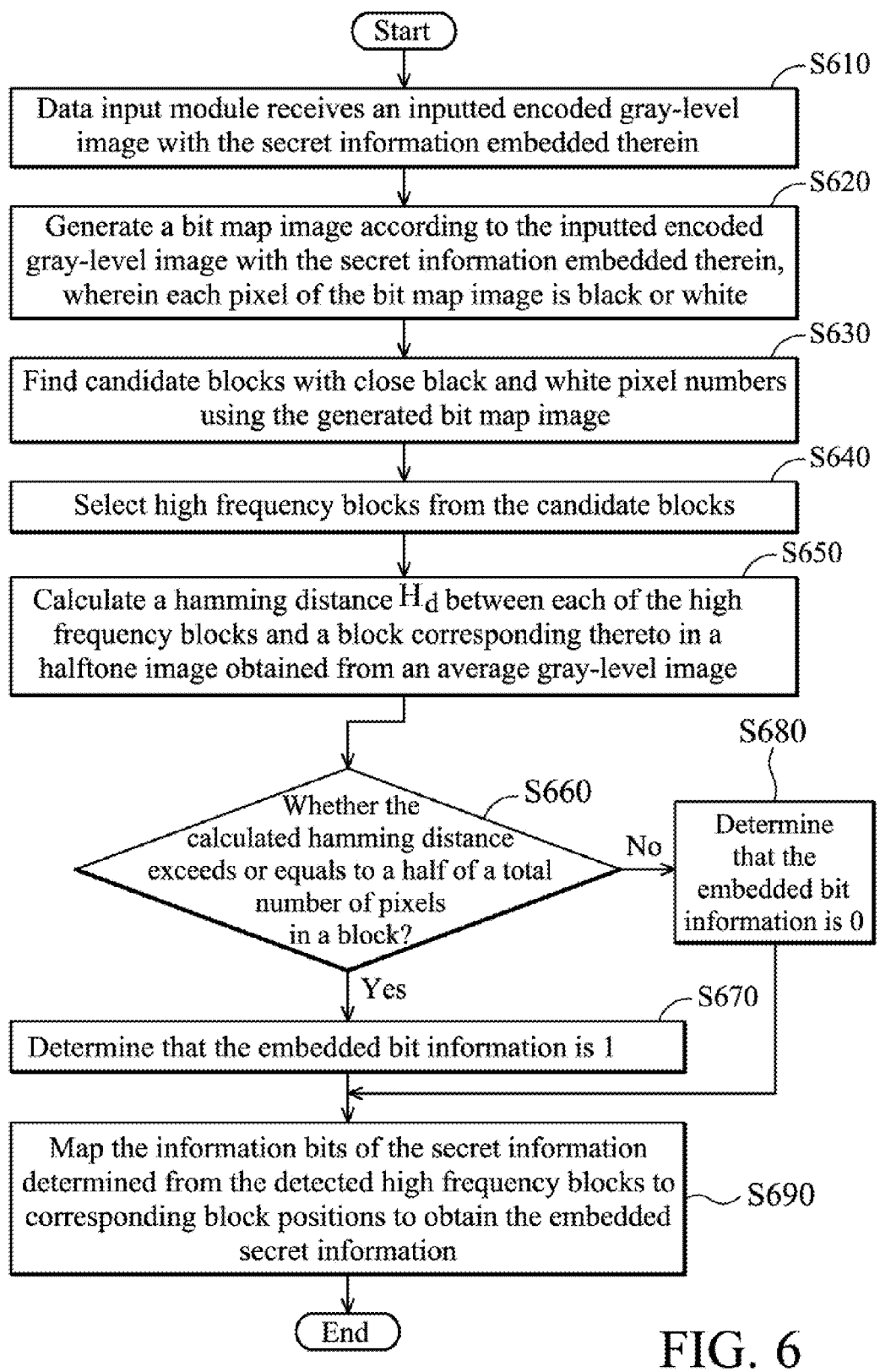
FIG. 6 is a flowchart showing an embodiment of a data hiding method for decoding a secret information from an inputted encoded gray-level image with the secret information embedded therein and restoring the gray-level image or the color image according to the invention.

FIG. 6 is a flowchart showing an embodiment of a data hiding method for decoding, a secret information from an inputted encoded gray-level image with the secret information embedded therein and restoring the gray-level image or the color image according to the invention. The data hiding method of the invention can be applied in the system 100 shown in FIG. 1A. First, in step S610, an inputted encoded gray-level image 170 with the secret information embedded therein is received by the data input module 110. In this embodiment, the inputted encoded gray-level image is an ODBTC encoded image encoded by using the ODBTC method of the invention. Next, in step S620, a bit map image is obtained according to the inputted encoded gray-level image 170 with the secret information embedded therein, wherein each pixel of the bit map image is black or white. In this step, if a pixel value of one pixel in the ODBTC image equals to the high mean, the pixel value of the corresponding pixel in the bit map image is set to be 1 while if a pixel value of one pixel in the ODBTC image equals to the low mean, the pixel value of the corresponding pixel in the bit map image is set to be 0. Next, in step S630, the high frequency block analyzing unit 142 finds candidate blocks with close black and white pixel numbers among the image blocks of the generated bit map image by the formula (3) previously discussed. After determining all of the candidate blocks, in step S640, the high frequency block analyzing unit 142 selects and determines high frequency blocks from the candidate blocks by the aforementioned formula (4). Thereafter, in step S650, the information restoration unit 144 calculates a hamming distance, denoted as $H_d$, between each of the high frequency blocks and a block corresponding thereto in a bit map image obtained from an average gray-level image. The information restoration unit 144 may first obtain an average pixel value for all pixels in the ODBTC encoded image 170 by summing up the pixel values of all pixels and averaging the summed pixel value. The obtained average pixel value is applied to each pixel of the ODBTC encoded image 170 to form an average gray-level image, wherein pixel value of each pixel of the average gray-level image is equal to the average pixel value. Then, the aforementioned dither array (as shown in FIG. 2A) can be used on the average gray-level image to perform a second round ordered dithering operation to obtain the halftone image. Thereafter, in step S660, the information restoration unit 144 further determines whether the calculated hamming distance exceeds or equals to a half of a total number of pixels in a block. If the calculated hamming distance exceeds or equals to a half of a total number of pixels in a block (Yes in step S660), which represents that over a half of pixels in this block have been inversed, this block has been performed with a large number of inversions and thus this block is confirmed to be embedded with an information bit "1" (step S670). Otherwise, if the calculated hamming distance is less than a half of a total number of pixels in a block (No in step S660), which represents that over a half of pixels in this block does not be inversed, no inversion has been performed on this block and thus this block is confirmed to be embedded with an information bit "0" (step S680).

After performing the steps S670-680 on all high frequency blocks, in step S690, the information restoration unit 144 maps the information bits of the secret information determined from the detected high frequency blocks to corresponding block positions to obtain a halftone image. Note that the obtained halftone image is the embedded secret information. It is to be noted that, if the original secret information is first scattered by a predetermined key before embedding the secret information, an inverse-scattered operation must be performed on the obtained halftone image with the random key that is previously used so as to decode and obtain the actual embedded secret information. Due to the secret information is scattered by a predetermined key, the secret information embedded can be avoided to be manipulated and intentionally tampered with during transmittance of digital information. Moreover, by the data hiding method shown in FIG. 6, the embedded secret information can be 100% restored and thus the average decoding rate of 100% can be achieved.

Figure 7:
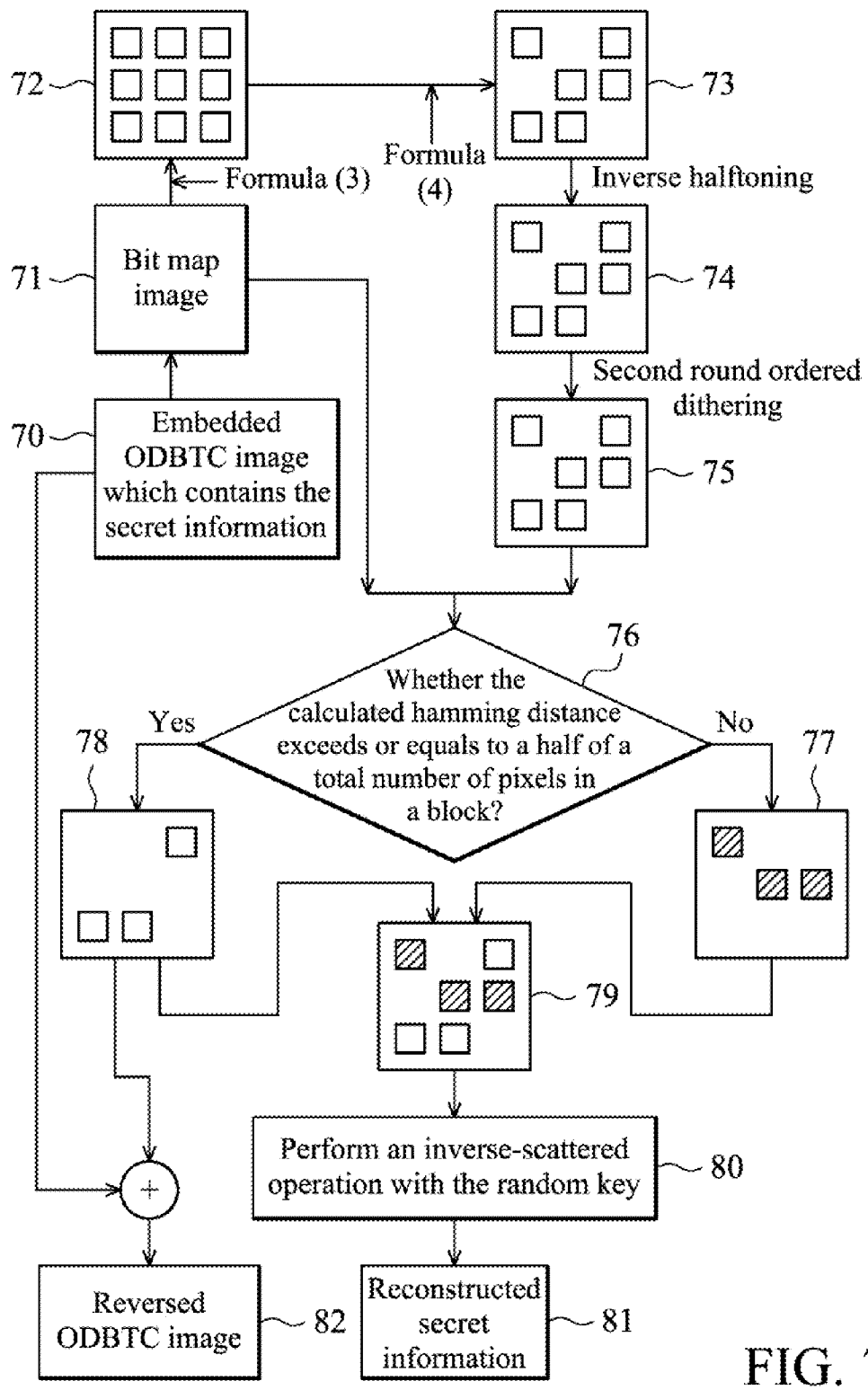
FIG. 7 is a flowchart showing another embodiment of a data hiding method for decoding a secret information from an inputted encoded gray-level image with the secret information embedded therein and restoring the gray-level image or the color image according to the invention.
Figure 8D:
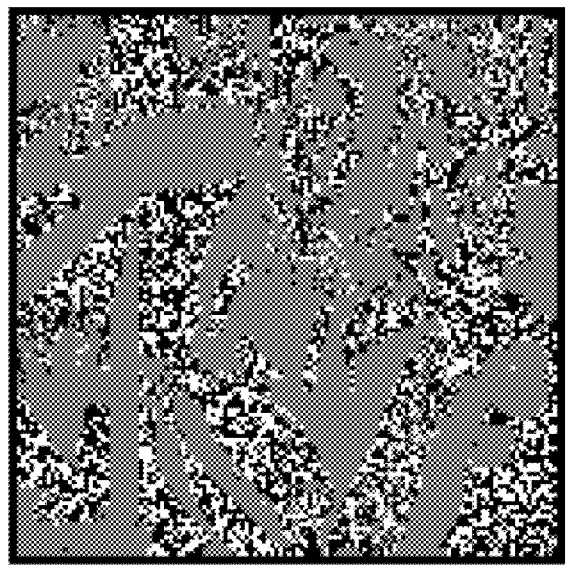
FIG. 8D shows an embodiment of a bit map image decoded from the image of FIG. 8C by using the data hiding method of the invention.

FIG. 7 is a flowchart showing another embodiment of a data hiding method for decoding a secret information from an inputted encoded gray-level image with the secret information embedded therein and restoring the gray-level image or the color image according to the invention. Please refer to FIGS. 8C-8D. FIG. 8D shows an embodiment of a bit map image decoded from the image of FIG. 8C by using the data hiding method of the invention.

First, the original gray-level image (50) (as shown in FIG. 8A) is encoded to the ODBTC image (51) (as shown in FIG. 8B) by the aforementioned ODBTC encoding method of the invention and then a bit map image (52) is obtained from the ODBTC image (51). Next, possible candidate blocks (53) are found from the bit map image (52) by the formula (3) and high frequency blocks (54) are selected from the possible candidate blocks (53) by the formula (4). The selected high frequency blocks (54) will be used for embedding the secret information. Thereafter, the secret information (55) is first scattered by a random key and then the scattered secret information are embedded into the corresponding high frequency blocks (54). When a bit value to be embedded is 1, bit values of all of pixels within a high frequency block to be embedded will be reversed, i.e. a black pixel is reversed to a white pixel while a white pixel is reversed to a black pixel. On the contrary, if a bit value to be embedded is 0, the bit values of all of pixels within the high frequency block to be embedded remain the same. Therefore, a changed bit map image can be generated, wherein the changed bit map image embeds the secret information. Lastly, the ODBTC image (51) and the changed bit map image are merged (58) to obtain an ODBTC image which contains the secret information (as shown in FIG. 8C). The ODBTC image which contains the secret information is referred to as the encoded gray-level image. Then, the encoded gray-level image can be transmitted to receiving end.

First, a received ODBTC image (70) with the secret information embedded therein is used for obtaining a bit map image (71). The step of obtaining a bit map image (71) from the received ODBTC image (70) can be performed by setting a pixel value of a corresponding pixel in the bit map image to be 1 if the pixel value of one pixel of a block in the ODBTC image (70) equals to the high mean of the block and setting the pixel value of the corresponding pixel in the bit map image (71) to be 0 if a pixel value of one pixel of a block in the ODBTC image (70) equals to the low mean of the block. Note that here the bit map image (71) still embeds the secret information. Next, the bit map image (71) is processed with the formula (3) to find candidate blocks (72) with close black and white pixel numbers among the image blocks of the bit map image (71). The candidate blocks (72) are processed with the formula (4) to select and determine high frequency blocks (73) belonging to the high frequency regions therefrom. The selected high frequency blocks (73) are then processed with inverse halftoning to obtain a bit map image (74) that is performed with the inverse halftoning and the bit map image (74) is processed with a second round ordered dithering using the same dither array (as shown in FIG. 2A) as in the encoding end to obtain a changed bit map image (75). Thereafter, a hamming distance, denoted as $H_d$, between the changed bit map image (75) and the bit map image (71) obtained from the ODBTC image (70) is calculated and whether the calculated hamming distance exceeds or equals to a half of a total number of pixels in a block is further determined (76). For example, in this embodiment, a total number of pixels in a block is 16 due each block is of size 4×4. Therefore, the determination of whether the calculated hamming distance exceeds or equals to a half of a total number of pixels in a block is equal to determine whether the calculated hamming distance exceeds or equals to 8. If the calculated hamming distance exceeds or equals to a half of a total number of pixels in a block, which represents that over a half of pixels in this block have been inversed, this block has been performed with a large number of inversions and thus this block is confirmed to be embedded with an information bit "1". Thus, all blocks embedded with an information bit "1" (78) can be found. Otherwise, if the calculated hamming distance is less than a half of a total number of pixels in a block, which represents that over a half of pixels in this block does not be inversed, no inversion has been performed on this block and thus this block is confirmed to be embedded with an information bit "0". Thus, all blocks embedded with an information bit "0" (77) can also be found. Thereafter, the blocks embedded with an information bit "0" (77) and the blocks embedded with an information bit "1" (78) are merged together to obtain a temporal bit map image (as shown in FIG. 8D). If the original secret information does not scatter by any random key at the encoding end, the temporal bit map image is the embedded secret information. However, in this embodiment, the original secret information is first scattered by a random key before embedding the secret information at the encoding end, an inverse-scattered operation must be performed on the temporal bit map image with the random key that is previously used (80) so as to decode and obtain reconstructed secret information (81). In addition, to restore the original gray-level image, the blocks embedded with an information bit "1" (78) and the corresponding blocks in the ODBTC image (70) with the secret information embedded therein are compared and all pixel values within blocks of the ODBTC image (70) corresponding to the blocks embedded with an information bit "1" (78) are reversed to obtain a reversed ODBTC image (i.e. the decoded image). Accordingly, the original gray-level image can be obtained from the reversed ODBTC image.

It is understood that although each of the aforementioned modules or units of the invention has been illustrated as a single component of the system, two or more such components can be integrated together, thereby decreasing the number of the components within the system. Similarly, one or a multiple of the above components can be separately used, thereby increasing the number of the components within the system. In addition, the modules or the unit components of the invention can be implemented by any hardware, firmware, or software methods or combination thereof.

Systems and data hiding methods thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. An image data processing system, comprising:
an image input module, receiving an image and a secret information and obtaining at least one gray-level image according to the image;
a bit map generation module coupled to the image input module, generating a bit map image according to the gray-level image and generating an ordered dithering block truncation coding (ODBTC) image according to the bit map image and the gray-level image, wherein each pixel of the bit map image is black or white; and
an encoding module coupled to the image input module and the bit map generation module, generating an encoded gray-level image according to the bit map image and the secret information, wherein the encoding module divides the gray-level image into a plurality of image blocks, finds candidate blocks with close black and white pixel numbers among the image blocks, selects high frequency blocks belong to the high frequency region of the image from the candidate blocks, and randomly embeds the secret information into the high frequency blocks to generate the encoded gray-level image with the secret information embedded therein,
wherein the encoding module further comprises a high frequency block analyzing unit and the high frequency block analyzing unit further finds the candidate blocks with close black and white pixel numbers among the image blocks by the following formula:

|#black pixel−#white pixel|<$BW_{Th}$, wherein #black pixel represents a total number of black pixels within a block, #white pixel represents a total number of white pixels within the block and $BW_{Th}$ represents an adjustable threshold parameter.

2. The image data processing system of claim 1, wherein the encoding module further comprises an information embedding unit for randomly embedding the secret information into the high frequency blocks by reversing bit values of all of pixels within a high frequency block to be embedded to generate a corresponding block in the changed bit map image when a bit value of the secret information being embedded is 1 while remaining bit values of all of pixels within the high frequency block to be embedded the same to generate a corresponding block in the changed bit map image when a bit value of the secret information being embedded is 0.

3. The image data processing system of claim 1, further comprising a decoding module for decoding the secret information from the encoded gray-level image that is embedded with the secret information and restoring the gray-level image.

4. The image data processing system of claim 1, wherein the image comprises a color image having at least one color plane and the image input module further obtains the gray-level image according to the color plane.

5. A data hiding method for hiding a secret information into an image for use in a system which comprises at least one bit map generation module and one encoding module, wherein the method comprises:
receiving an image and a secret information and obtaining at least one gray-level image according to the image;
utilizing the bit map generation module to generate an ordered dithering block truncation coding (ODBTC) image according to the gray-level image and a halftone array and obtain a bit map image corresponding to the ODBTC image;
utilizing the encoding module to divide the gray-level image into a plurality of image blocks and find candidate blocks with close black and white pixel numbers among the image blocks;
utilizing the encoding module to select high frequency blocks belong to the high frequency region of the image from the candidate blocks;
utilizing the encoding module to randomly embed the secret information into the high frequency blocks to obtain a changed bit map image; and
utilizing the encoding module to obtain a maximum value and a minimum value of each image block within the gray-level image and replace a corresponding block, within the changed bit map image, of each image block within the gray-level image by the obtained maximum value and the minimum value of each image block to generate an encoded gray-level image with the secret information embedded therein,
wherein the encoding module further comprises a high frequency block analyzing unit and the high frequency block analyzing unit further finds the candidate blocks with close black and white pixel numbers among the image blocks by the following formula:

|#black pixel−#white pixel|<$BW_{Th}$, wherein #black pixel represents a total number of black pixels within a block, #white pixel represents a total number of white pixels within the block and $BW_{Th}$ represents an adjustable threshold parameter.

6. The data hiding method of claim 5, wherein the step of utilizing the encoding module to randomly embed the secret information into the high frequency blocks further comprises:
reversing bit values of all of pixels within a high frequency block to be embedded to generate a corresponding block in the changed bit map image when a bit value of the secret information being embedded is 1; and
remaining the bit values of all of pixels within the high frequency block to be embedded the same to generate a corresponding block in the changed bit map image when a bit value of the secret information being embedded is 0.

7. The data hiding method of claim 5, wherein the step of utilizing the encoding module to randomly embed the secret information into the high frequency blocks is performed by using a random key to randomly scatter the secret information and then embedding the scattered secret information into the high frequency blocks.

8. The data hiding method of claim 5, wherein the image comprises a color image having at least one color plane and the step of obtaining at least one gray-level image according to the image is performed by obtaining the gray-level image according to the color plane.

9. A data hiding method for decoding a secret information from an inputted encoded gray-level image with the secret information embedded therein for use in a system which comprises at least one decoding module, wherein the method comprises:
utilizing the decoding module to obtain a bit map image according to the inputted encoded gray-level image;
utilizing the decoding module to divide the bit map image into a plurality of image blocks and find candidate blocks with close black and white pixel numbers among the image blocks;
utilizing the decoding module to select high frequency blocks belong to the high frequency region of the encoded gray-level image from the candidate blocks;
utilizing the decoding module to determine an embedded bit value of each of the high frequency blocks using the high frequency blocks in the bit map image and an average gray-level image corresponding to the inputted encoded gray-level image; and utilizing the decoding module to obtain the secret information using the determined embedded bit value of each of the high frequency blocks, wherein the step of utilizing the decoding module to determine the embedded bit value of each of the high frequency blocks using the high frequency blocks in the bit map image and the average gray-level image further comprises:

obtaining a corresponding bit map image according to the average gray-level image;

calculating a hamming distance between each of the high frequency blocks and a block corresponding thereto in the corresponding bit map image;

determining that the embedded bit value of a first high frequency block of the high frequency blocks is 1 when the calculated hamming distance exceeds or equals to a half of a total number of pixels in the first high frequency block; and determining that the embedded bit value of the first high frequency block is 0 when the calculated hamming distance is less than a half of the total number of pixels in the first high frequency block.

10. The data hiding method of claim 9, further comprising:

utilizing the decoding module to restore a gray-level image using the determined embedded bit value of each of the high frequency blocks and the inputted encoded gray-level image, wherein all pixel values within a first block of the inputted encoded gray-level image corresponding to a first high frequency block of the high frequency blocks are reversed to generate the gray-level image.

11. The data hiding method of claim 9, wherein the step of utilizing the decoding module to find candidate blocks with close black and white pixel numbers among the image blocks is performed by determining whether each of the image blocks satisfies following formula to find the candidate blocks with close black and white pixel numbers among the image blocks:

$$|\#black\ pixel - \#white\ pixel| < BW_{Th},$$

wherein #black pixel represents a total number of black pixels within a block, #white pixel represents a total number of white pixels within the block and $BW_{TH}$ represents an adjustable threshold parameter.

* * * * *